J. A. LAKIN.
Overdraw Checks.
No. 148,307.
Patented March 10, 1874.
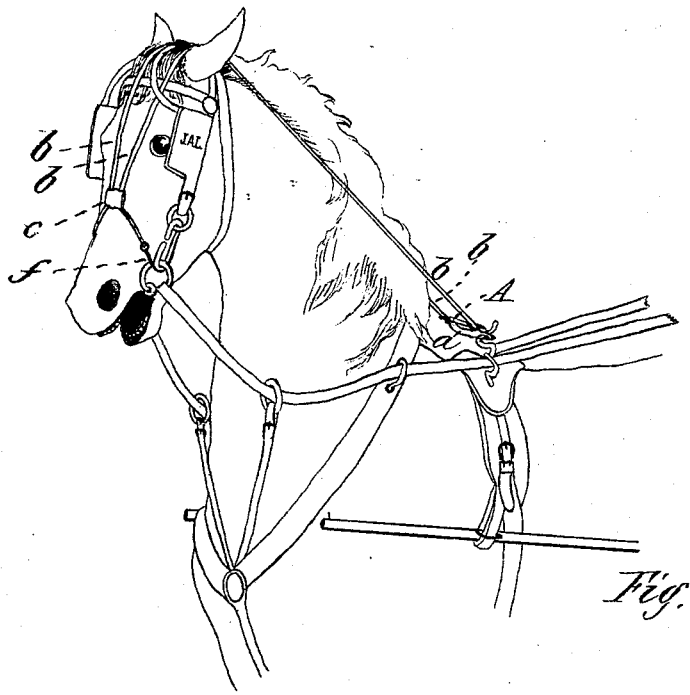
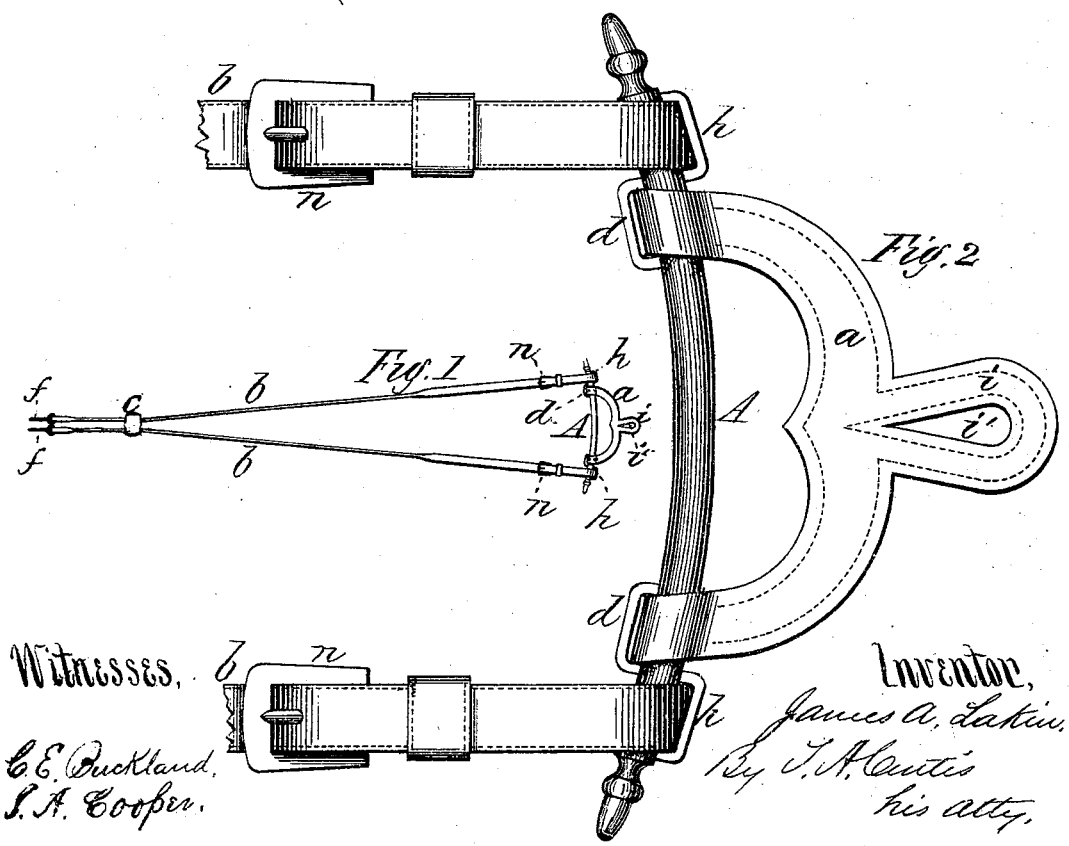

UNITED STATES PATENT OFFICE.

JAMES A. LAKIN, OF WESTFIELD, MASSACHUSETTS.

IMPROVEMENT IN OVERDRAW-CHECKS.

Specification forming part of Letters Patent No. 148,307, dated March 10, 1874; application filed December 13, 1873.

*To all whom it may concern:*

Be it known that I, JAMES A. LAKIN, of Westfield, State of Massachusetts, have invented an Improvement in Overdraw-Checks, of which the following is a specification:

My invention relates to an improvement in an overdraw-check for a harness; and it consists of two parallel straps provided with a buckle or hook at one end, and, passing through a loop, are attached, at their other ends, to a bar, which is provided with a bifurcated piece having a hole therein, or a suitable hook or other fastening secured thereto, by means of which it is attached to the water-hook of the saddle.

The object of my invention is to prevent the mane of the horse from being cut and worn away, as is the case with the use of the ordinary over-check, and also to prevent the mouth of the horse from being made sore.

In the drawings, Figure 1 is a plan view of my invention. Fig. 2 is a plan view, full size, of the bar and its fastening, and the parallel straps attached thereto; and Fig. 3 is a sketch, showing its adaptation and attachment to a harness.

$b\ b$ represent two straps, which are provided at one end with suitable hooks or buckles $f$, by means of which they are attached to the bit-ring $e$ of the bridle, and said straps extend, parallel with each other, to a suitable length, passing through a loop, $c$, and the other end of each strap is attached to a bar, A, near each end, being passed through a staple or clasp, $h$, to keep the straps in place upon the bar, and each strap may be lengthened or shortened by means of the buckles $n$. Each end of a bifurcated piece, $a$, is passed around the bar A, and through the staple or clasp $d$, and properly secured by stitching or otherwise fastened, and the bifurcated piece is provided with a loop, $i$, having a hole, $i'$, therein, by means of which the said piece $a$ is attached to the water-hook of the saddle; or, instead of the hole $i'$, a hook or other fastening may be secured to the piece $a$ as a means of attaching the bar to the water-hook.

The operation of my invention is as follows:

The hook $f$ at one end of each strap $b$ is attached to the ring $e$ of the bit, and, if the horse is inclined to hold his head down and toward his breast, the loop $c$ is slipped down somewhat low and near to the bit, as shown in Fig. 3; but, if the horse is inclined to throw his nose forward, the loop may be moved farther up. After the straps $b$ leave the clasp $c$ they are held apart by each passing through a loop on the head-piece of the bridle, near each ear, and from thence the straps extend back, one upon each side the neck of the horse, and their rear ends are attached to the bar A, which is attached to the water-hook of the saddle.

In the ordinary construction of the overdraw-check, a single strap is used, which is split at the end, to attach to each ring of the bit, and passes over the horse's head as a single strap, and is split again and attached to the water-hook without any bar A. By this arrangement, as the horse turns his head to one side and the other, the strap cuts and wears off his mane, so much so that oftentimes the mane is completely ruined; and the straps being connected and rigid, as the horse turns his head to one side, one strap draws hard upon one side of his mouth, and often makes it sore.

My invention completely obviates this trouble, as the straps, being separate, and the bar A being secured to the water-hook, turn thereon as upon a pivot, and allows the horse a free movement of his head to either side without any undue pulling or strain upon his mouth, and the straps $b$ are held away from his mane, and preventing it from being cut off or worn away.

The piece $a$ may be of metal, and of any suitable form, to be used as a means of attaching the bar A to the water-hook.

Having thus described my invention, what I claim as new is—

The combination of the piece $a$, bar A, straps $b\ b$, and loop $c$, all forming an improved overdraw-check, substantially as described.

JAMES A. LAKIN.

Witnesses:
 H. B. LEWIS,
 HENRY C. SMITH.